(12) United States Patent
Kang et al.

(10) Patent No.: US 11,285,415 B2
(45) Date of Patent: Mar. 29, 2022

(54) WATER PURIFIER AND FLOW RATE CONTROL METHOD THEREFOR

(71) Applicant: COWAY CO., LTD., Chungcheongnam-do (KR)

(72) Inventors: Dae-Sik Kang, Seoul (KR); Byoung-Phil Lee, Seoul (KR); Hyoung-Min Moon, Seoul (KR); Sang-Hyeon Kang, Seoul (KR); Dong-Hun Lee, Seoul (KR)

(73) Assignee: Coway Co., Ltd

( * ) Notice: Subject to any disclaimer, the term of this patent is extended or adjusted under 35 U.S.C. 154(b) by 202 days.

(21) Appl. No.: 16/468,529

(22) PCT Filed: Nov. 29, 2017

(86) PCT No.: PCT/KR2017/013788
§ 371 (c)(1),
(2) Date: Jun. 11, 2019

(87) PCT Pub. No.: WO2018/110868
PCT Pub. Date: Jun. 21, 2018

(65) Prior Publication Data
US 2019/0329168 A1     Oct. 31, 2019

(30) Foreign Application Priority Data
Dec. 12, 2016 (KR) .......................... 10-2016-0168597

(51) Int. Cl.
*B01D 35/147* (2006.01)
*B01D 35/157* (2006.01)
(Continued)

(52) U.S. Cl.
CPC ........... *B01D 37/043* (2013.01); *B01D 61/02* (2013.01); *B01D 29/925* (2013.01);
(Continued)

(58) Field of Classification Search
CPC .. B01D 35/1475; B01D 37/043; B01D 61/02; C02F 1/008; C02F 1/441; C02F 2209/10
See application file for complete search history.

(56) References Cited

U.S. PATENT DOCUMENTS

| | | | |
|---|---|---|---|
| 2011/0147285 A1* | 6/2011 | Bonnelye | G05B 13/0205 210/134 |
| 2014/0021112 A1 | 1/2014 | Boodaghians et al. | |

FOREIGN PATENT DOCUMENTS

| | | |
|---|---|---|
| CN | 103908894 | 7/2014 |
| CN | 104722207 | 6/2015 |

(Continued)

OTHER PUBLICATIONS

PCT/ISA/210 Search Report issued on PCT/KR2017/013788 pp. 5.
(Continued)

*Primary Examiner* — Bradley R Spies
(74) *Attorney, Agent, or Firm* — The Farrell Law Firm, P.C.

(57) ABSTRACT

A water purifier according to an embodiment of the present invention comprises: a filtering unit for producing purified water by filtering influent water; a TDS measuring unit for measuring the total dissolved solids (TDS) in the water flowing into the filtering unit; a purified water passage through which the purified water is discharged; a concentrated water passage through which concentrated water, filtered by the filtering unit, is discharged; a concentrated water flow control valve for controlling the flow rate of the concentrated water discharged through the concentrated water passage; and a control unit for adjusting the degree of opening and closing of the concentrated water control valve, on the basis of the TDS and the pressure of the water flowing into the filtering unit.

11 Claims, 4 Drawing Sheets

(51) Int. Cl.
*B01D 37/04* (2006.01)
*B01D 61/02* (2006.01)
B01D 29/92 (2006.01)

(52) U.S. Cl.
CPC ........ *B01D 35/1475* (2013.01); *B01D 35/157* (2013.01); *B01D 2311/04* (2013.01)

(56) References Cited

FOREIGN PATENT DOCUMENTS

| | | |
|---|---|---|
| CN | 105771657 | 7/2016 |
| JP | 0839065 | 2/1996 |
| JP | 08-229554 | 9/1996 |
| JP | 2013066840 | 4/2013 |
| KR | 100175900 | 3/1999 |
| KR | 1020090095052 | 9/2009 |
| KR | 1020140024754 | 3/2014 |
| KR | 1020140111091 | 9/2014 |
| KR | 1020160082744 | 7/2016 |
| TW | 201219314 | 5/2012 |
| WO | WO 2012/063587 | 5/2012 |
| WO | WO 2014/018896 | 1/2014 |
| WO | WO 2016/074763 | 5/2016 |

OTHER PUBLICATIONS

PCT/ISA/237 Written Opinion issued on PCT/KR2017/013788 pp. 5.
European Search Report dated Jan. 7, 2020 issued in counterpart application No. 17881972.8-1101, 11 pages.
Chinese Office Action dated Dec. 3, 2020 issued in counterpart application No. 201780076511.3, 9 pages.

\* cited by examiner

[FIG. 1]
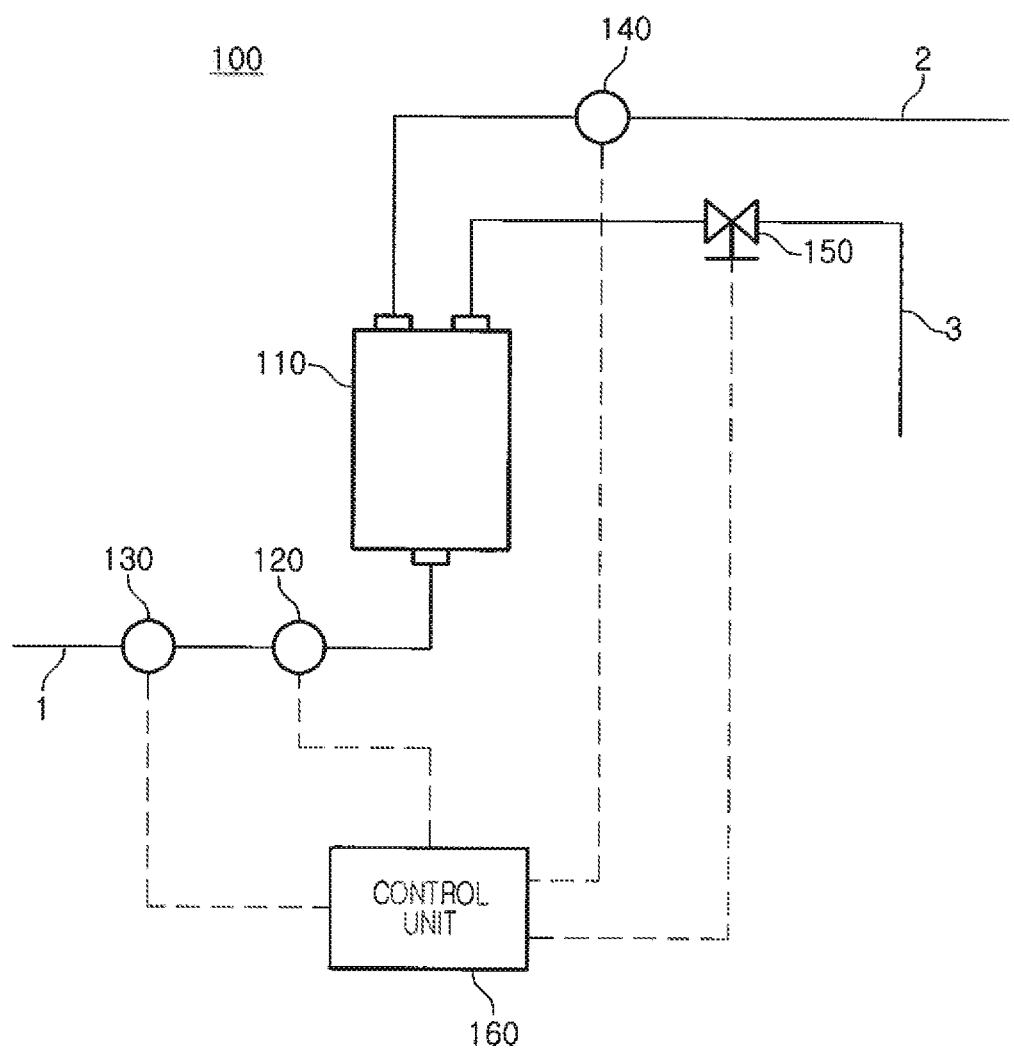

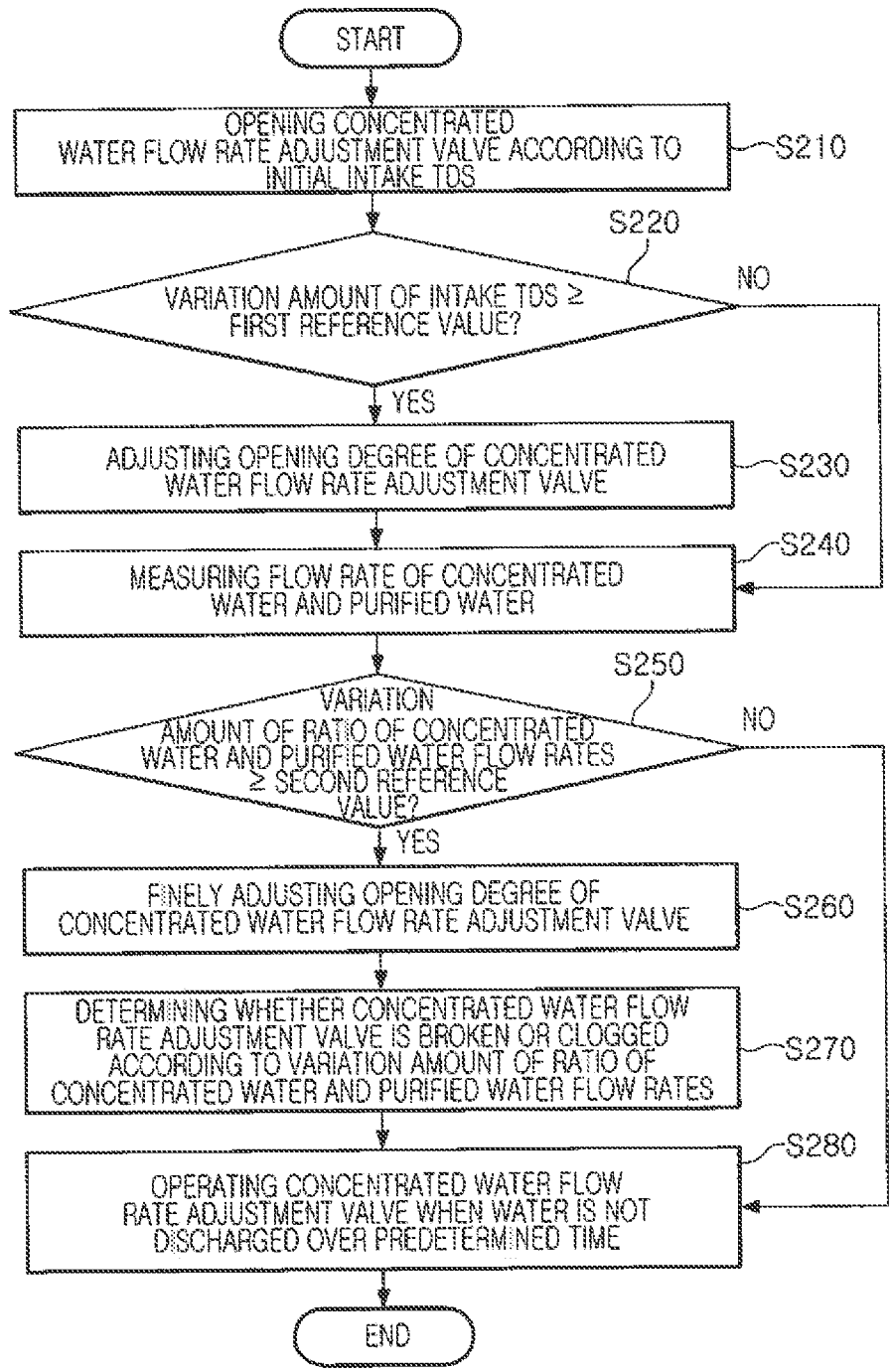

[FIG. 3]
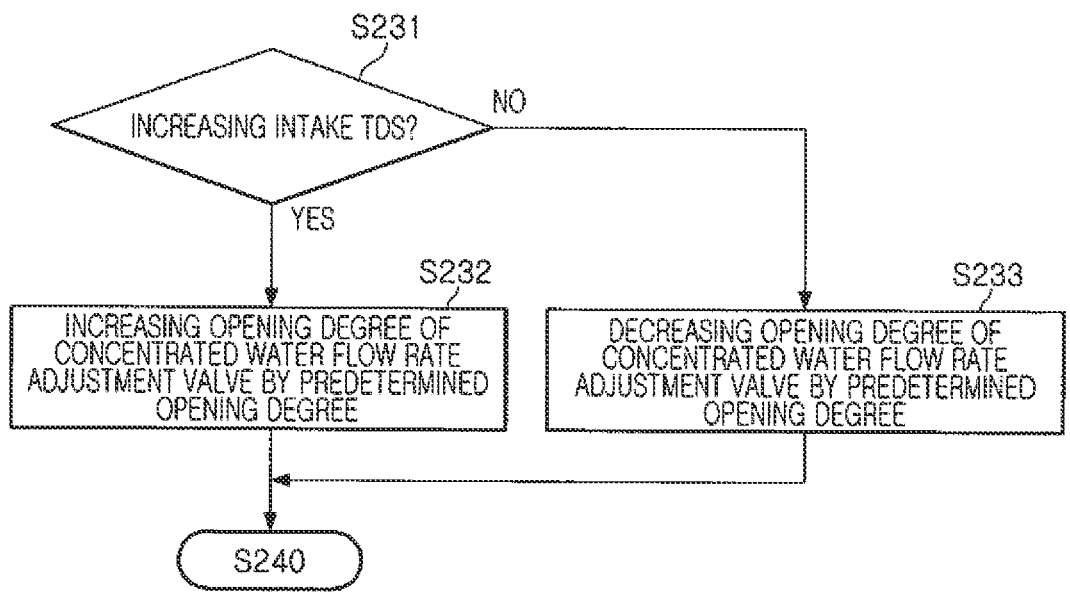
[FIG. 4]
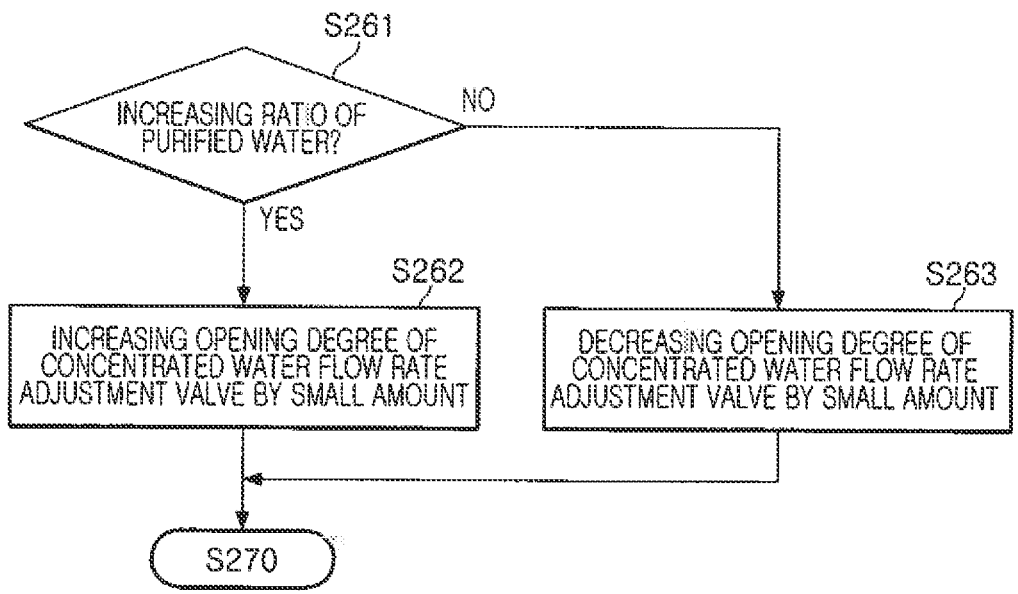

[FIG. 5]
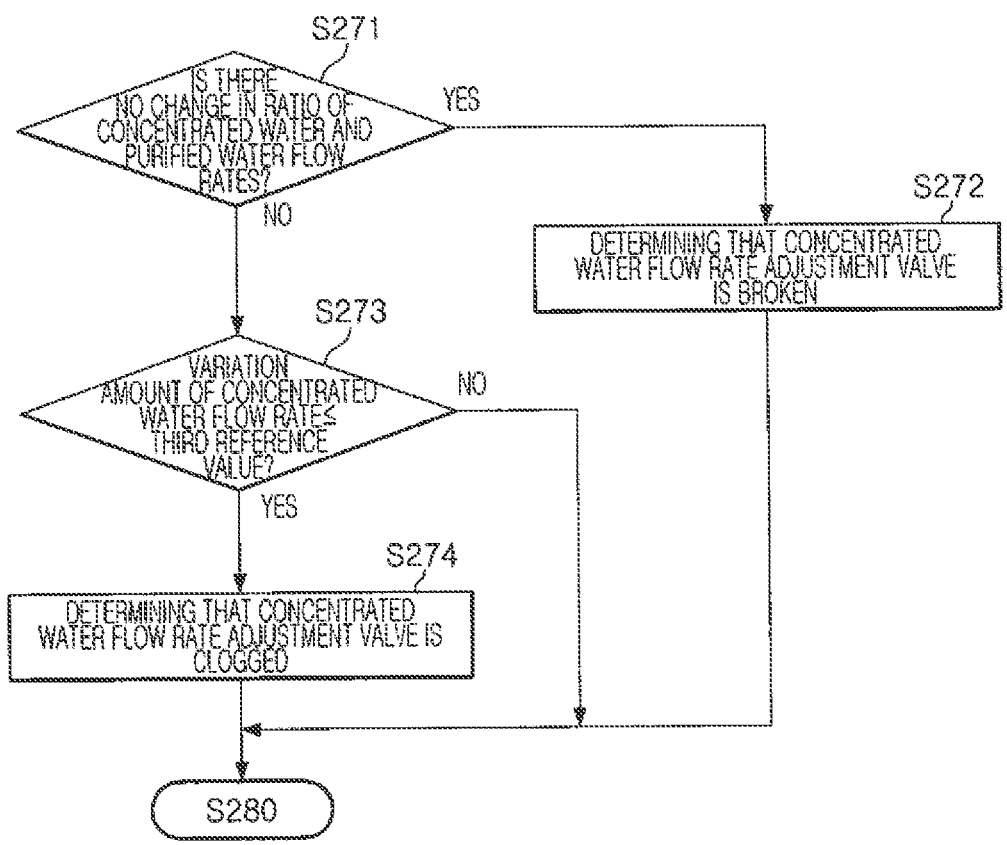

WATER PURIFIER AND FLOW RATE CONTROL METHOD THEREFOR

PRIORITY

This application is a National Phase Entry of International Application No. PCT/KR2017/013788, which was filed on Nov. 29, 2017, and claims priority to Korean Patent Application No. 10-2016-0168597, which was filed on Dec. 12, 2016, the content of each of which is incorporated herein by reference.

TECHNICAL FIELD

The present disclosure relates to a water purifier and a flow rate control method therefor.

BACKGROUND ART

A water purifier may use a reverse osmosis filter to remove harmful components such as impurities, or the like, contained in water.

Such a reverse osmosis filter may remove very fine impurities such as impurities, environmental hormones, heavy metals, bacteria, and the like, contained in water, by using a microfilm, and discharge the harmful components externally through a concentrated water channel.

In this case, a ratio of purified water to water supplied to the filter may be referred to as a recovery rate, and the recovery rate may be adjusted by controlling an amount of concentrated water discharged through the concentrated water channel.

Since the recovery rate is related to an ion removal performance of the reverse osmosis filter, to control the flow rate of the concentrated water may be important such that the recovery rate may be maintained at an appropriate value.

Thus, Patent Document 1 described in the following prior art document discloses a water purifier.

(Patent Document 1) Korean Patent Publication No. 10-2014-0024754 (Publication Date: Mar. 3, 2014).

DISCLOSURE

Technical Problem

Accordingly, there is a need in the art for a method for controlling a flow rate of concentrated water so as to maintain a certain level of an ion removal performance in a water purifier using a reverse osmosis filter.

Technical Solution

According to an aspect of the present disclosure, a water purifier may include: a filter unit for generating purified water by filtering influent water; a TDS measurement unit provided on a front end of the filter unit to measure TDS of water flowing into the filter unit; a second flow rate measurement unit provided on a rear end of the filter unit to measure a flow rate of the purified water discharged from the filter unit; a concentrated water flow rate adjustment valve for adjusting a flow rate of concentrated water discharged from the filter unit; and a control unit for controlling an opening degree of the concentrated water adjustment valve on a basis of a measurement value received from at least one of the TDS measurement unit, the first flow rate measurement unit, and the second flow rate measurement unit.

According to another aspect of the present disclosure, a flow rate control method of a water purifier may include steps of: opening a concentrated water flow rate adjustment valve by a predetermined opening angle according to an initial intake TDS value measured at an initial operation of a water purifier; adjusting an opening degree of the concentrated water flow rate adjustment valve, when a variation amount of the intake TDS value is equal to or greater than a first reference value; and adjusting the opening degree of the concentrated water flow rate adjustment valve, when a variation amount of a ratio of concentrated water and purified water flow rates is equal to or greater than a second reference value.

In addition, the means for solving the above-mentioned problems are not all enumerating the features of the present disclosure. The various features of the present disclosure and the advantages and effects thereof will be more fully understood by reference to the following specific embodiments.

Advantageous Effects

According to an embodiment of the present disclosure, an opening degree of a concentrated water flow rate adjustment valve may be precisely controlled on the basis of the intake TDS value and the flow rate of the concentrated water and the purified water.

DESCRIPTION OF DRAWINGS

FIG. 1 is a schematic view of a configuration of a water purifier according to an embodiment of the present disclosure.

FIG. 2 is a flowchart of a flow rate control method of a water purifier according to another embodiment of the present disclosure.

FIG. 3 is a detailed flowchart in step S230 illustrated in FIG. 2.

FIG. 4 is a detailed flowchart in step S260 illustrated in FIG. 2.

FIG. 5 is a detailed flowchart in step S270 illustrated in FIG. 2.

BEST MODE FOR INVENTION

Hereinafter, exemplary embodiments of the present disclosure will be described in detail with reference to the accompanying drawings. The disclosure may, however, be exemplified in many different forms and should not be construed as being limited to the specific embodiments set forth herein, and those skilled in the art and understanding the present disclosure can easily accomplish retrogressive inventions or other embodiments included in the scope of the present disclosure by the addition, modification, and removal of components within the same scope, but those are construed as being included in the scope of the present disclosure. Like reference numerals will be used to designate like components having similar functions throughout the drawings within the scope of the present disclosure.

Throughout the specification, a configuration is referred to as being 'connected' to another configuration, including not only when the configurations are directly connected but also when they are indirectly connected with each other. In addition, when a component is referred to as "comprise" or "comprising," it means that it may include other components as well, rather than excluding other components, unless specifically stated otherwise.

FIG. 1 is a schematic view of a configuration of a water purifier according to an embodiment of the present disclosure.

Referring to FIG. 1, a water purifier according to an embodiment of the present disclosure may be configured to include: a filter unit 110, a TDS measurement unit 120, a first flow rate measurement unit 130, a second flow rate measurement unit 140, a concentrated water flow rate adjustment valve 150, and a control unit 160.

The filter unit 110 may be for generating purified water by filtering influent water, and may be implemented with a reverse osmosis membrane filter.

The filter unit 110 may be connected to a first flow path 1 through which water flows into the filter unit 110, a second flow path 2 through which purified water generated in the filter unit 110 is discharged, and a third flow path 3 through which concentrated water filtered by the filter unit 110 is discharged. Here, the concentrated water may refer to water containing solid substance filtered by the filter unit 110, and may be discharged to externally through the third flow path 3.

Here, the water flowing into the filter unit 110 may be raw water flowing from an outside, or may be water, for example, which has passed through a pre-treatment filter (not shown) including at least one of a sediment filter and a pre-carbon filter.

In addition, a post-treatment filter (not shown) including, for example, a post-carbon filter may be disposed on a rear end of the filter unit 110, that is, on the second flow path 2.

The TDS measurement unit 120 may be provided on the front end of the filter unit 110, that is, on the first flow path 1 to measure the TDS of the water flowing into the filter unit 110 through the first flow path 1. The TDS measurement unit 120 may measure TDS of influent water, when water is flowing through the first flow path 1, and may transmit the measured TDS value to the control unit 160.

The first flow rate measurement unit 130 may be provided on the front end of the filter unit 110, that is, on the first flow path 1, to measure the flow rate of the water (that is, raw water) flowing into the filter unit 110 through the first flow path 1. The first flow rate measurement unit 130 may measure the flow rate of the influent water, when water is flowing through the first flow path 1, and may transmit the measured flow rate value to the control unit 160.

The second flow rate measurement unit 140 may be provided on the rear end of the filter unit 110, that is, on the second flow path 2, to measure the flow rate of purified water discharged through the second flow path 2. The second flow rate measurement unit 140 may measure the flow rate of the discharged purified water when purified water is discharged through the second flow path 2, and may transmit the measured flow rate value to the control unit 160.

The concentrated water flow rate adjustment valve 150 may be provided on the third flow path 3, and may adjust the flow rate the concentrated water discharged through the third flow path 3 by opening and closing under a control of the control unit 160.

According to an embodiment of the present disclosure, the concentrated water flow rate adjustment valve 150 may be implemented to include a valve (not shown) capable of adjusting the flow rate of the concentrated water discharged through the third flow path 3 by adjusting a degree of opening and closing and a motor (not shown) for adjusting a degree of opening and closing of the valve according to a control signal transmitted from the control unit 160.

The control unit 160 may be for controlling an overall operation of a water purifier 100, and may be implemented, for example, to include at least one processing unit and a memory. Here, the processing unit may include, for example, a central processing unit (CPU), a graphics processing unit (GPU), a microprocessor, an application specific integrated circuit (ASIC), field programmable gate arrays (FPGA), and the like, and may have a plurality of cores. The memory may be a volatile memory, a non-volatile memory, or a combination thereof.

The control unit 160 may control an opening degree of the concentrated water flow rate adjustment valve 150 on the basis of a measurement value received from at least one of the TDS measurement unit 120, the first flow rate measurement unit 130, and the second flow rate measurement unit 140.

Specifically, the control unit 160 may open the concentrated water flow rate adjustment valve 150 by a predetermined opening angle according to the initial intake TDS value transmitted from the TDS measurement unit 120. Here, the predetermined opening angle may be derived by an experiment on a correlation between the initial intake TDS value and the recovery rate according to the opening angle of the concentrated water flow rate adjustment valve 150, and may be set at an optimum opening angle for accomplishing a target recovery rate according to the initial intake TDS value.

In addition, the control unit 160 may adjust the opening degree of the concentrated water flow rate adjustment valve 150 when the variation amount of the intake TDS value transmitted from the TDS measurement unit 120 after opening the concentrated water flow rate adjustment valve 150 by the predetermined opening degree according to the initial intake TDS value. Specifically, the control unit 160 may compare the initial intake TDS value transmitted from the TDS measurement unit 120 with the previously measured intake TDS value (for example, the initial intake TDS value), and when the intake TDS value is increased by a first reference value or more, the opening degree of the concentrated water flow rate adjustment valve 150 may be increased by the predetermined opening angle to increase a ratio of concentrated water (that is, the recovery rate is decreased), and when the intake TDS value is decreased by a first reference or more, the opening degree of the concentrated water flow rate adjustment valve 150 may be decreased by the predetermined opening angle to decrease a ratio of the concentrated water (that is, the recovery rate is increased).

In addition, the control unit 160 may grasp flow rates of concentrated water and purified water from the flow rate of raw water and the flow rate of purified water, transmitted from first and second flow rate measurement units 130 and 140, respectively, and when the variation amount of the ratio of the concentrated water and purified water flow rates is equal to or greater than the second reference value, the opening degree of the concentrated water flow rate adjustment valve 150 may be finely adjusted. Specifically, the control unit 160 may compare the ratio of concentrated water and purified water flow rates with the previously calculated ratio of the concentrated water and the purified water flow rates (for example, the ratio of the concentrated water and purified water flow rates in the case of opening the concentrated water flow rate adjustment valve 150 by the predetermined opening angle according to the initial intake TDS value), and when the ratio of the purified water is increased by the second reference value or more, the opening degree of the concentrated water flow rate adjustment valve 150 may be increased by a small amount by a predetermined opening angle to increase the ratio of the concentrated water (that is, the recovery rate is decreased), and when the ratio of the purified water is decreased by the second reference value or more, the opening degree of the concentrated water flow rate adjustment valve 150 may be decreased by a small amount by a predetermined opening angle to decrease the ratio of the concentrated water (that is, the recovery rate is increased).

In addition, the control unit 160 may determine whether the concentrated water flow rate adjustment valve 150 is broken or clogged according to the variation amount of the ratio of the concentrated water and purified water flow rates after finely adjusting the opening degree of the concentrated water flow rate adjustment valve 150. Specifically, the control unit 160 may determine that the concentrated water flow rate adjustment valve 150 is broken when there is no change in the ratio of the concentrated water and purified water flow rates even after finely adjusting the opening degree of the concentrated water flow rate adjustment valve 150, and when the variation amount of the concentrated water flow rate after finely adjusting the concentrated water flow rate adjustment valve 150 is equal to or lower than a third reference value, it can be determined that the concentrated water flow rate adjustment valve 150 is clogged. In this case, the control unit 160 may inform an user of breakdown or clogging of the concentrated water flow rate adjustment valve 150 through a visual or audible notification means (not shown), or the like.

In addition, the control unit 160 may operate the concentrated water flow rate adjustment valve 150 even when water is not discharged over a predetermined time (for example, may open, close, or return to an original opening degree after adjusting an opening degree of the concentrated water flow rate adjustment valve 150). Accordingly, sticking or scale clogging or the valve, which may occur when the concentrated water flow rate adjustment valve 150 is not used for a long period of time may be prevented.

Hereinafter, a flow rate control method by the water purifier described above with reference to FIGS. 2 to 5 will be described in detail.

FIG. 2 is a flowchart of a flow rate control method of a water purifier according to another embodiment of the present disclosure, FIG. 3 is a detailed flowchart in S230 step, FIG. 4 is a detailed flowchart in S260 step illustrated in FIG. 2, and FIG. 5 is a detailed flowchart in S270 step illustrated in FIG. 2.

Referring to FIG. 2, a concentrated water flow rate adjustment valve may be opened by a predetermined opening angle according to an initial intake TDS value at the time of an initial operation (that is, when water is discharged) of a water purifier (S210).

Thereafter, when the variation amount of the intake TDS value is equal or greater than the first reference value (S220), the opening degree of the concentrated water flow rate adjustment valve may be adjusted (S230).

Specifically, as illustrated in FIG. 3, when the intake TDS value is increased (S231), the opening degree of the concentrated water flow rate adjustment valve may be increased by a predetermined opening degree to increase the ratio of the concentrated water (that is, the recovery rate is decreased) (S232), and when the intake TDS value is reduced, the opening degree of the concentrated water flow rate adjustment valve may be decreased by a predetermined opening degree to reduce the ratio of the concentrated water (for example, the recovery rate is increased) (S233).

Thereafter, the flow rates of the concentrated water and purified water may be measured (S240), and when the variation amount of the ratio of the concentrated water and purified water flow rates is equal to or greater than the second reference value (S250), the opening degree of the concentrated water flow rate adjustment valve may be finely adjusted (S260).

Specifically, as illustrated in FIG. 4, when the ratio of the purified water is increased (S261), the opening degree of the concentrated water flow rate adjustment valve may be increased by a small amount by a predetermined opening angle to increase the ratio of the concentrated water (that is, the recovery rate is decreased) (S262), and when the ratio of the purified water is decreased, the opening degree of the concentrated water flow rate adjustment valve may be decreased by a small amount by a predetermined opening angle to decrease the ratio of the concentrated water (that is, the recovery rate is increased) (S263).

Thereafter, it is possible to determine whether the concentrated water flow rate adjustment valve is broken or clogged according to the variation amount of the ratio of the concentrated water and the purified water flow rates (S270).

Specifically, as illustrated in FIG. 5, when there is no change in the ratio of the concentrated water and purified water flow rates even after finely adjusting the opening degree of the concentrated water flow rate adjustment valve (S271), it can be determined that the concentrated water flow rate adjustment valve is broken (S272). On the other hand, when there is a change in the ratio of the concentrated water and purified water flow rates, but the variation amount of the concentrated water flow rate is equal to or lower than the third reference value (S273), it can be determined that the concentrated water flow rate adjustment valve is clogged (S274).

Thereafter, the concentrated water flow rate adjustment valve may be operated when water is not discharged over a predetermined time (S280).

The flow rate control method of the water purifier described above with reference to FIGS. 2 to 5 may be performed by a processor, or the like, mounted on the water purifier.

While the present invention has been described with reference to exemplary embodiments in the present disclosure is not limited thereto, but various modifications may be made within the technical ideas of the present disclosure.

The invention claimed is:

1. A water purifier comprising:
   a filter unit for generating purified water by filtering influent water;
   a TDS measurement unit provided on a front end of the filter unit to measure TDS of water flowing into the filter unit;
   a first flow rate measurement unit provided on the front end of the filter unit to measure a flow rate of the water flowing into the filter unit;
   a second flow rate measurement unit provided on a rear end of the filter unit to measure a first flow rate of the purified water discharged from the filter unit;
   a concentrated water flow rate adjustment valve for adjusting a second flow rate of concentrated water discharged from the filter unit; and
   a control unit for controlling an opening degree of the concentrated water flow rate adjustment valve on a basis of a measurement value received from at least one of the TDS measurement unit, the first flow rate measurement unit, and the second flow rate measurement unit,
   wherein the control unit adjusts the opening degree of the concentrated water flow rate adjustment valve according to the variation amount of the ratio of the first flow rate and the second flow rate, and wherein the control unit grasps flow rates of concentrated water and purified water transmitted from the first flow rate measurement unit and the second flow rate measurement unit, respectively, and adjusts the opening degree of the concentrated water flow rate adjustment valve when a variation amount of a ratio of the concentrated water and purified water flow rates is equal to or greater than a second reference value.

2. The water purifier of claim 1, wherein the control unit opens the concentrated water flow rate adjustment valve by a predetermined opening angle according to an initial TDS value transmitted from the TDS measurement unit.

3. The water purifier of claim 1, wherein the control unit adjusts the opening degree of the concentrated water flow rate adjustment valve when a variation amount of the TDS value transmitted from the TDS measurement unit is equal to or greater than a first reference value.

4. The water purifier of claim 3, wherein the control unit increases the opening degree of the concentrated water flow rate adjustment valve by a predetermined opening angle when the TDS value is increased.

5. The water purifier of claim 3, wherein the control unit decreases the opening degree of the concentrated water flow rate adjustment valve by the predetermined opening angle when the TDS value is decreased.

6. The water purifier of claim 1, wherein the control unit increases the opening degree of the concentrated water flow rate adjustment valve by the predetermined opening angle when the ratio of purified water is increased.

7. The water purifier of claim 1, wherein the control unit decreases the opening degree of the concentrated water flow rate adjustment valve by the predetermined opening angle when the ratio of purified water is decreased.

8. The water purifier of claim 1, wherein the control unit determines whether the concentrated water flow rate adjustment valve is broken or clogged according to the variation amount of the ratio of the concentrated water and purified water flow rates.

9. The water purifier of claim 8, wherein the control unit determines that the concentrated water flow rate adjustment valve is broken when there is no change in the ratio of the concentrated water and purified water flow rates even after adjusting the opening degree of the concentrated water flow rate adjustment valve.

10. The water purifier of claim 8, wherein the control unit determines that the concentrated water flow rate adjustment valve is clogged when the variation amount of the concentrated water flow rate is equal to or lower than a third reference value.

11. The water purifier of claim 1, wherein the control unit operates the concentrated water flow rate adjustment valve when water is not discharged over a predetermined time.

* * * * *